US012727579B2

(12) United States Patent
Cheung et al.

(10) Patent No.: US 12,727,579 B2
(45) Date of Patent: Sep. 8, 2026

(54) AUTOMATIC FEEDER APPARATUS, SYSTEMS, AND METHODS THEREOF

(71) Applicant: The Hong Kong University of Science and Technology, Hong Kong (CN)

(72) Inventors: Hiu Tung Cheung, Hong Kong (CN); Tsz Ching Chan, Hong Kong (CN); Tsz Wai Fung, Hong Kong (CN); Chi Ming Reuben Cheung, Hong Kong (CN); Yat Wa Chan, Hong Kong (CN); Ching Walter Lee, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 18/941,030

(22) Filed: Nov. 8, 2024

(65) Prior Publication Data

US 2025/0151694 A1 May 15, 2025

Related U.S. Application Data

(60) Provisional application No. 63/598,147, filed on Nov. 13, 2023.

(51) Int. Cl.

*A01K 5/02* (2006.01)
*A01K 1/03* (2006.01)
*A01K 1/035* (2006.01)

(52) U.S. Cl.

CPC ............ *A01K 5/0291* (2013.01); *A01K 1/031* (2013.01); *A01K 1/0356* (2013.01)

(58) Field of Classification Search

CPC ..... A01K 5/0291; A01K 1/031; A01K 1/0356
USPC ............. 119/51.01, 51.03, 51.11, 56.2, 57.1, 119/61.51, 419, 469, 477

See application file for complete search history.

(56) References Cited

U.S. PATENT DOCUMENTS

| | | | | |
|---|---|---|---|---|
| 3,361,116 A * | 1/1968 | Daniel | A01K 1/0356 | 119/515 |
| 3,653,360 A * | 4/1972 | Foster | A01K 5/0291 | 119/51.14 |
| 3,853,096 A * | 12/1974 | Whitty | A01K 1/0356 | 119/60 |

(Continued)

FOREIGN PATENT DOCUMENTS

| | | |
|---|---|---|
| BR | 202019008591 U2 | 10/2019 |
| CN | 204653349 U | 9/2015 |

(Continued)

OTHER PUBLICATIONS

Zhang L, Liu Z, Wang J, Li R, et al. Randomized controlled trial for time-restricted eating in overweight and obese young adults. (2022). iScience 25, 104870. doi: 10.1016/j-isci.2022.104870.

(Continued)

*Primary Examiner* — Maria E Graber
(74) *Attorney, Agent, or Firm* — S&F/WEHRW

(57) ABSTRACT

An automatic feeder apparatus for feeding a rodent in a cage is provided. The automatic feeder apparatus comprises a food container for holding food, and the food container comprises an accessible region and a blocked region. The food container is configured to be automatically switchable between an accessible state, in which the food is accessible to the rodent, and a blocked state, in which the food is blocked from access to the rodent.

26 Claims, 15 Drawing Sheets

(56) References Cited

U.S. PATENT DOCUMENTS

| | | | | |
|---|---|---|---|---|
| 4,248,175 | A | 2/1981 | Navarro | |
| 5,899,169 | A * | 5/1999 | Jenson | A01K 5/0291 119/51.13 |
| 7,497,187 | B2 * | 3/2009 | Ingley, III | A01K 1/031 119/417 |
| 7,527,020 | B2 * | 5/2009 | Conger | A01K 1/031 119/417 |
| 7,882,806 | B2 * | 2/2011 | Ver Hage | A01K 1/031 119/500 |
| 8,037,847 | B2 * | 10/2011 | Malnati | A01K 1/031 119/419 |
| 8,047,160 | B2 * | 11/2011 | Tamborini | A01K 1/031 119/472 |
| 9,930,866 | B2 * | 4/2018 | Deritis | A01K 5/0291 |
| 10,743,517 | B2 | 8/2020 | Springer et al. | |
| 10,973,204 | B2 * | 4/2021 | Coiro | A01K 1/031 |
| 11,589,553 | B2 * | 2/2023 | Bernardini | A01K 7/00 |
| 11,653,621 | B2 * | 5/2023 | Bernardini | A01K 1/031 119/417 |
| 12,433,250 | B2 * | 10/2025 | Maddahi | A01K 29/005 |
| 2005/0066908 | A1 * | 3/2005 | Park | A01K 1/031 119/419 |
| 2007/0169714 | A1 * | 7/2007 | Conger | A01K 1/0356 119/419 |
| 2007/0175404 | A1 * | 8/2007 | Conger | A01K 1/0356 119/420 |
| 2007/0181074 | A1 * | 8/2007 | Conger | A01K 1/031 119/417 |
| 2009/0126640 | A1 | 5/2009 | Ulman et al. | |
| 2011/0061600 | A1 * | 3/2011 | Conger | A01K 1/0356 119/419 |
| 2011/0132272 | A1 * | 6/2011 | Gabriel | A01K 1/031 119/475 |
| 2011/0297098 | A1 * | 12/2011 | Conger | A01K 1/0356 119/475 |
| 2013/0228134 | A1 * | 9/2013 | Conger | A01K 1/031 119/417 |
| 2017/0000081 | A1 * | 1/2017 | Betts-Lacroix | A61B 5/7264 |
| 2020/0037579 | A1 * | 2/2020 | Eom | A01K 5/025 |
| 2020/0128783 | A1 * | 4/2020 | Bernardini | A01K 1/031 |
| 2022/0295741 | A1 * | 9/2022 | Southwell | A01K 1/031 |
| 2022/0378012 | A1 * | 12/2022 | Coiro | A01K 1/031 |
| 2023/0123020 | A1 * | 4/2023 | Bernardini | A01K 1/0058 119/417 |
| 2023/0210086 | A1 | 7/2023 | Trottier et al. | |
| 2024/0081276 | A1 | 3/2024 | Franklin et al. | |

FOREIGN PATENT DOCUMENTS

| | | | |
|---|---|---|---|
| CN | 218649683 | U | 3/2023 |
| JP | 6387922 | B2 | 9/2018 |

OTHER PUBLICATIONS

Keenan S J, Cooke M B, Hassan E B, Chen W S, et al. Intermittent fasting and continuous energy restriction result in similar changes in body composition and muscle strength when combined with a 12 week resistance training program. (2021). European Journal of Nutrition 61:2183-2199. doi: 10.1007/s00394-022-02804-3.

Wilkinson M J, Manoogian E N C, Zadourian A, Lo H, et al. Ten-Hour Time-Restricted Eating Reduces Weight, Blood Pressure, and Atherogenic Lipids in Patients with Metabolic Syndrome. (2019). Cell Metabolism 31, 92-104. doi: 10.1016/j.cmet.2019.11.004.

Acosta-Rodriguez V, Fijo-Ferreira F, Izumo M, Xu P, et al. Circadian alignment of early onset caloric restriction promotes longevity in male C57BL/6J mice. (2022). Science Jun. 10; 376(6598): 1192-1202. doi: 10.1126/science.abk0297.

Home Cage Phenotype Assessment.

Phenome Technology (https://phenometechnologies.com/feeders.html).

First Office Action of Application No. or Patent No. 2024116055385 issued from the China National Intellectual Property Administration (CNIPA) on Apr. 30, 2026.

* cited by examiner

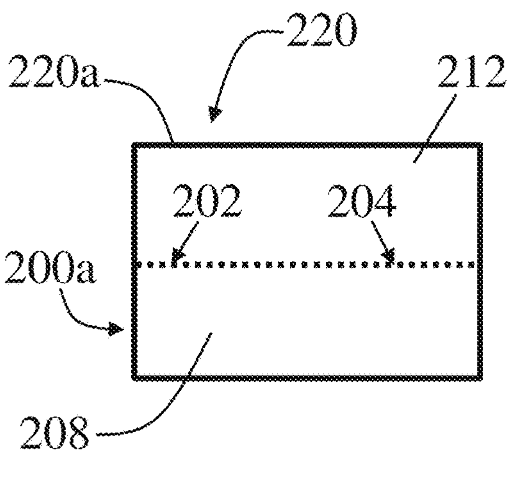
Fig. 2A
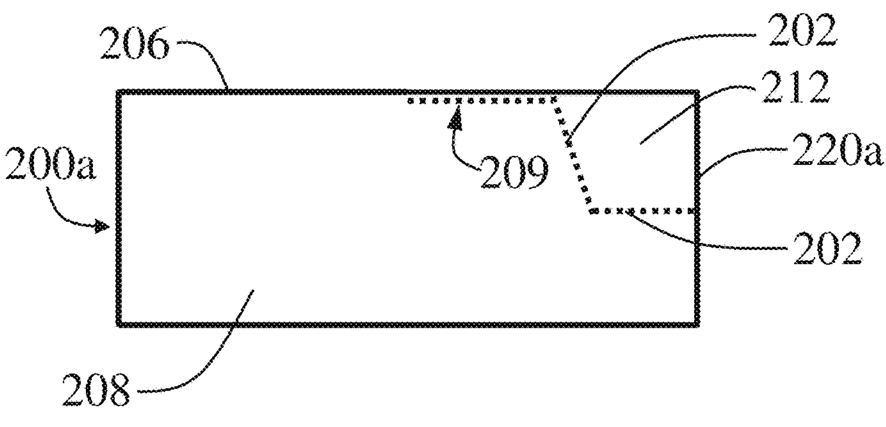
Fig. 2B
220
200
212
214
Fig. 2C

AUTOMATIC FEEDER APPARATUS, SYSTEMS, AND METHODS THEREOF

CROSS-REFERENCE TO RELATED APPLICATIONS

This application claims priority to the U.S. provisional patent application Ser. No. 63/598,147, filed Nov. 13, 2023, entitled “A programmable automatic feeder system for time-restricted feeding in rodents”, hereby incorporated herein by reference as to its entirety.

FIELD OF THE DISCLOSURE

The present disclosure generally relates to feeding of rodents.

BACKGROUND

Any discussion of the prior art throughout the specification should in no way be considered as an admission that such prior art is widely known or forms part of common general knowledge in the field.

Time-restricted feeding (TRF) is a commonly adopted strategy for weight reduction. TRF, including Intermittent fasting (IF), is an approach that controls feeding and fasting patterns within a restricted period. It has demonstrated that TRF can ameliorate the progression of biological aging, thereby extending organismal lifespan and health span. Increasing research is focusing on investigating the molecular pathways and behavioural enhancements associated with TRF. Numerous TRF schemes have been carried out on rodents. However, performing TRF experiments typically requires the researchers to manually add and remove food from the rodents at regular time points. This is labor-intensive and requires a great deal of manpower and time.

Rodents are nocturnal animals, generally feeding at night. It is particularly challenging to study TRF schemes with night feeding that follow the circadian rhythms of the rodents. Due to the large scale of laboratory feeding, the size of the cage and reduction of food contamination must be considered. Household pet food trays are usually large, where pets get their food from above. As such, food is more likely to be stepped on and contaminated by feces. To reduce the food contamination, laboratory rodent food trays are often located at the top of the cage (see e.g. FIG. 1A). The rodents get the food from the top of the cage.

Although several feeders are sold for laboratory rodents, these products are either cumbersome or cannot achieve a genuine TRF scheme. Most currently available automatic feeders offer a function of a scheduled food release only. For example, Tecniplast provides a series of cages. Each cage comprises a food tray located at the upper portion of the cage. FIG. 1A shows a sketch of the Tecniplast cage 100. The cage 100 can be covered with a lid 110. Both the cage 100 and the lid 110 are made of transparent material, such as PP, PC, or PSU, facilitating observation of a rodent 104 within the cage 100. A food tray 102 is provided at the top portion of the cage 100, so that the rodent 104 gets food 106 from underneath. The food tray 102 can accommodate food 106 and water containers (e.g. water pouches or bottles) separately.

FIG. 1B shows a sketch of a BioDAQ feeder 120 mounted to a cage 122 for housing a rodent 104. The cage 122 provides a cage opening 124 so that the feeder 120 can be mounted on the cage 122 with the feeder opening 126 aligning with the cage opening 124. This is less compatible with existing top feeding cages, as the cage must provide the cage opening 124 on the side of the cage. Inside the feeder 120, a sloped panel 128 is provided and only a limited amount of the food 106 can reach the bottom of the feeder 120.

SUMMARY

According to embodiments of the present disclosure, there is provided with an automatic feeder apparatus for feeding a rodent in a cage. The automatic feeder apparatus comprises a food container for holding food. The food container comprises an accessible region and a blocked region. The food container is configured to be automatically switchable between an accessible state, in which the food is accessible to the rodent, and a blocked state, in which the food is blocked from access to the rodent.

According to certain embodiments, the food container comprises a shield for forming the blocked region.

According to certain embodiments, the food container comprises a food compartment for holding the food. The food compartment is moveable within the food container between the accessible region and the blocked region for switching the food container between the accessible state and the blocked state.

According to certain embodiments, the food compartment is formed between a pair of slabs.

According to certain embodiments, the food container comprises a guide rail for directing movement of the pair of slabs. The pair of slabs are movable along the guide rail between the accessible region and the blocked region.

According to certain embodiments, one or more openings are provided on top of a space between the pair of slabs for receiving food into the food compartment.

According to certain embodiments, the food container is rotatable to switch between the accessible state and the blocked state.

According to certain embodiments, the food container comprises a cylindrical body and a shield for covering a circumferential portion of the cylindrical body to form the blocked region.

According to certain embodiments, the food container comprises a grille food tray with gratings for allowing the food in the accessible region to be accessed by the rodent.

According to certain embodiments, a spacing between neighbouring gratings is smaller than the size of the food such that the food is capable of being held onto the grille food tray.

According to embodiments of the present disclosure, an automatic feeder system is provided. The automatic feeder system comprises an automatic feeder apparatus in accordance with one or more embodiments, an actuator for actuating the automatic feeder apparatus such that the food container of the automatic feeder apparatus is switchable between the accessible state and the blocked state, and an electric circuit for applying a time-restricted feeding (TRF) schedule to the automatic feeder apparatus.

According to certain embodiments, the actuator is selected from a group consisting of an electric motor, a linear actuator, and a solenoid cylinder.

According to certain embodiments, the food container comprises a food compartment for holding the food. The food compartment is formed between a pair of slabs. The food container comprises a guide rail for directing movement of the pair of slabs such that the pair of slabs are movable along the guide rail. The automatic feeder system further comprises a Hall sensor for detecting current of the actuator.

According to certain embodiments, the electric circuit is configured to control the actuator such that the pair of slabs apply a rebound function when the current of the actuator is detected to be increased via the Hall sensor.

According to certain embodiments, the food container is rotatable to switch between the accessible state and the blocked state, and the rotation speed of the food container is 6 rotations per minute (RPM).

According to certain embodiments, the automatic feeder system is configured to operate at a voltage no higher than 12V.

According to embodiments of the present disclosure, there is provided with a method for feeding a rodent by using an automatic feeder system in accordance with one or more embodiments. The method comprises pre-setting a TRF schedule and applying the TRF schedule to the automatic feeder apparatus for feeding the rodent by executing the electric circuit.

According to certain embodiments of the present disclosure, applying the TRF schedule comprises: at a first preset time point, actuating, by executing the actuator by the electric circuit, the automatic feeder apparatus to switch the food container to the accessible state for feeding the rodent; and at a second preset time point, actuating, by executing the actuator by the electric circuit, the automatic feeder apparatus to switch the food container to the blocked state such that the rodent is prevented from being fed.

According to certain embodiments of the present disclosure, actuating the automatic feeder apparatus to switch the food container to the accessible state comprises: linearly moving a food compartment of the food container between the accessible region and the blocked region within the food container, the food compartment holding the food; or rotating the food container for moving the food between the accessible region and the blocked region.

According to certain embodiments of the present disclosure, there is provided a system for feeding rodents in a plurality of cages. The system comprises a plurality of automatic feeder systems and a computer system. Each automatic feeder system is the automatic feeder system according to one or more embodiments of the present disclosure and corresponds to a respective cage of the plurality of cages. The computer system comprises a time-restricted feeding (TRF) application for applying TRF schedules to the rodents in the plurality of cages by switching states of automatic feeder apparatus of the plurality of automatic feeder systems simultaneously.

Other example embodiments are discussed herein.

BRIEF DESCRIPTION OF THE DRAWINGS

The detailed description is set forth with reference to the accompanying drawings. The drawings are provided for purposes of illustration only and merely depict example embodiments of the present disclosure. The drawings are provided to facilitate understanding of the present disclosure and shall not be deemed to limit the breadth, scope, or applicability of the present disclosure. The drawings are not to scale, unless otherwise stated. Certain parts of the drawings may be exaggerated for explanation purposes and shall not be considered limiting unless otherwise specified.

FIG. 2A is a schematic illustration of a front view of a rodent cage and an automatic feeder apparatus according to certain embodiments of the present disclosure.

FIG. 2B is a schematic illustration of a side view of the rodent cage and the automatic feeder apparatus of FIG. 2A.

FIG. 2C is a schematic illustration of a top view of an arrangement of a rodent cage and an automatic feeder apparatus according to certain embodiments of the present disclosure.

DETAILED DESCRIPTION

Figure 1A:
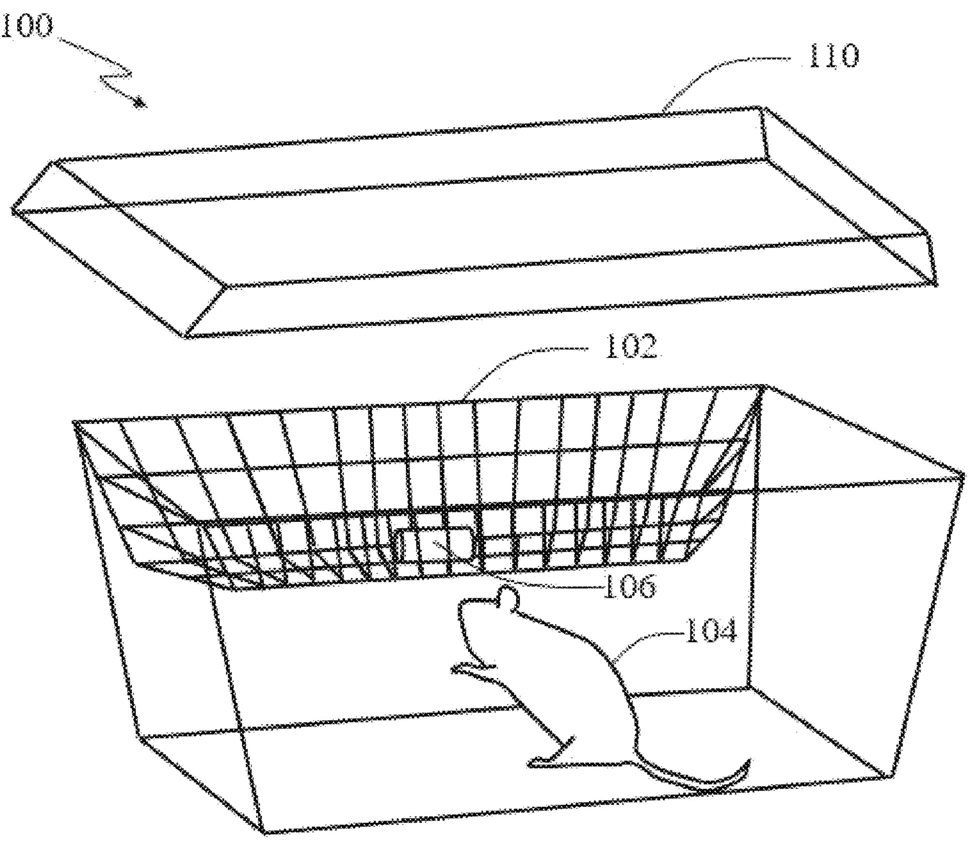
FIG. 1A illustrates a prior art Tecniplast cage.
Figure 1B:
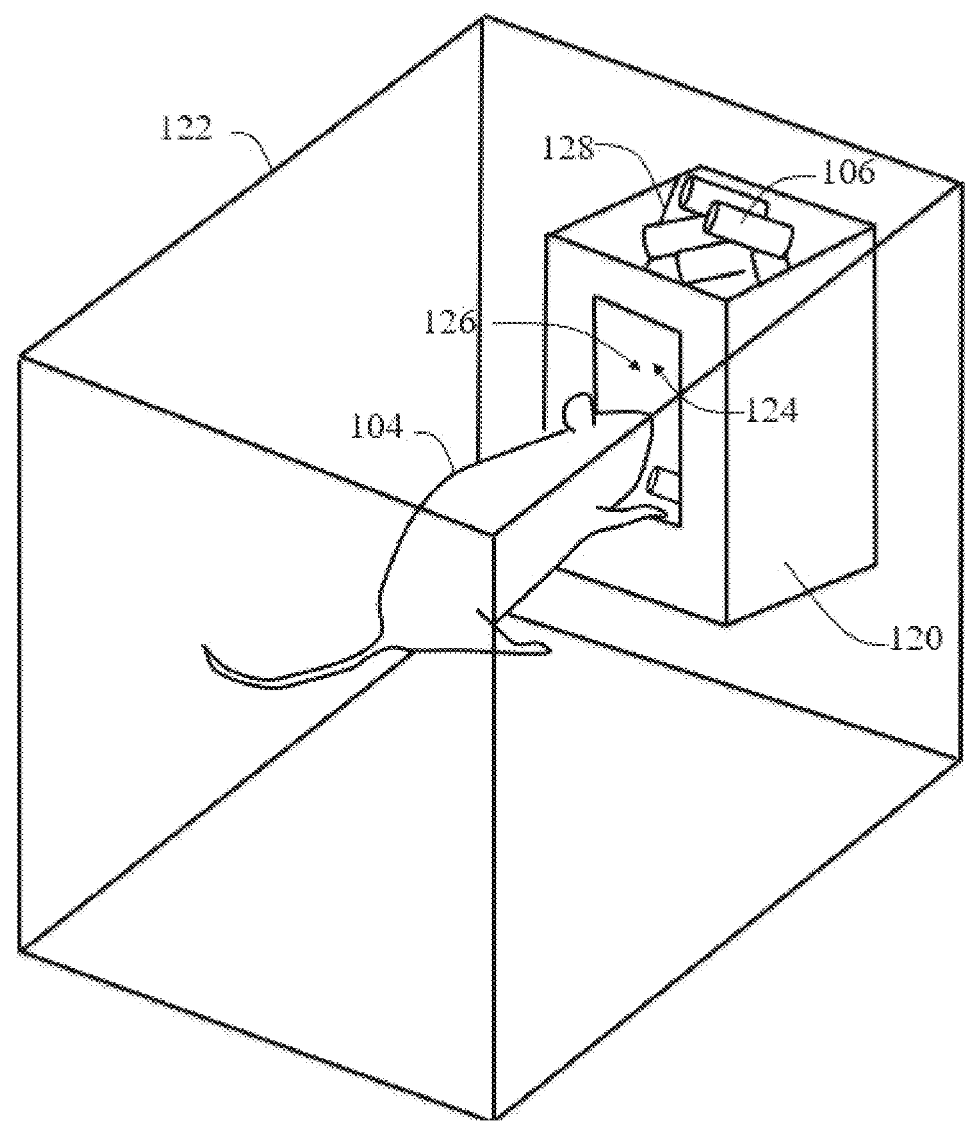
FIG. 1B illustrates a prior art BioDAQ feeder system.

The present disclosure will now be described with reference to the following examples which should be considered in all respects as illustrative and non-restrictive.

Throughout the description and the claims, the words “comprise”, “comprising”, and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", etc., to describe a common object, merely indicate that different instances of like objects are being referred to, and are not intended to imply that the objects so described must be in a given sequence, either temporally, spatially, in ranking, or in any other manner.

Embodiments of the present disclosure provide automatic feeder apparatus, systems, and methods thereof with improved performance.

The present inventors have recognized one or more disadvantages associated with the existing feeders. For example, many currently available feeders are designed primarily for domestic use and are large, which is unfavourable for certain applications, such as scientific research. Many existing feeders are cumbersome and a large workspace is required to install the equipment, thereby making them unsuitable for long-term and large-scale experiments. For example, many feeders are only designed for open cages and are not applicable to higher hygiene standard of individually ventilated cages (IVC). Furthermore, while some feeders comprise a function for timed food dispensing, there is no function to block access to food. Hence, it is challenging to determine the initial food input to ensure no leftover food remains during a fasting period. As such, these feeders cannot guarantee that a true fasting cycle happens consistently and a genuine TRF scheme is achieved.

One or more embodiments of the present disclosure provide an automatic feeder system comprising an automatic feeder apparatus with novel design. The system can be small-scale and able to implement a genuine time-restricted feeding scheme.

According to one or more embodiments, the time of food intake can be restricted in an automatic manner. Additionally and optionally, the feeding schedules (such as time of food intake) can be programmable. The setup is compatible with various conventional animal holding racks and animal holding rooms. Users can set up programmable repetitive schedules according to their preferences or needs. A genuine TRF scheme can be achieved. Food (such as food pellets or chunks) can be transferred between an accessible region and a blocked region in a food container at preset time points to either allow or prevent food access to the rodents.

One or more embodiments provide an automatic feeder apparatus or system that enables TRF with reduced or minimal human intervention. The schedule is programmable and in this sense in some embodiments, the apparatus or system is also called programmable automatic feeder apparatus or system. The provided automatic feeder mechanism restricts the time of food intake in a programmable and automated manner. It allows laboratory operators or researchers to set up programmable repetitive schedules, including a flexible feeding and fasting time frame, based on the experimental needs of the researchers. The automatic feeder mechanism permits blockage of food access from rodents during the fasting period, which achieves a true fasting cycle as no leftover food pellets or chunks remains accessible.

One or more embodiments provide an automatic feeder system that is fully automatic. The programmable electrical circuit or computer system allows the experimental users to set up desired repetitive fasting and feeding regimens. At preset time points, as pre-scheduled, the food container as included in the automatic feeder system can be automatically switched between an accessible state, in which the food is accessible to the rodent, and a blocked state, in which the food is blocked from access to the rodent. The state switching can be realised by operating the food container. The operation can be performed on the food container or one or more certain portions of the food container. For example, the state switching may be achieved by moving a food compartment that holds food within the food container between an accessible region and a blocked region of the food container. For another example, the state switching may be achieved by rotating the food container to expose or block the food to the rodent in a rodent cage. The system can accommodate the users' needs with reduced or minimal manpower required. This is advantageous over the existing labor-intensive and time-consuming system in which food is required to be added or removed manually at regular time points.

One or more embodiments provide a system for feeding rodents in a plurality of cages. The system can control all the connected cages to switch their states simultaneously. As a result, experimental studies on large numbers of rodents can be conducted efficiently and effectively, allowing for improved comparisons of experimental results in terms of accuracy, consistency, and other factors.

One or more embodiments provide an automatic feeder system with improved flexibility in setting up a TRF scheme. The system enables users to set up feeding and fasting cycles at any time with improved or high flexibility. The fasting and feeding periods can be as short as 1 minute, and there is no upper limit for the cycle length. This is advantageous over the existing system in which the feasibility of experimental time points is often limited by the available manpower, particularly for night feeding.

One or more embodiments provide high flexibility towards the food options when a grille food tray is used as a food container or constitutes a part of the food container. Any food pellet or chunk diet with a diameter larger than the grating of the grille food tray is compatible with the system. The use of alternating diets can be performed, including but not limited to, high-fat diets and Tamoxifen diets. The users can implement various experimental procedures aligned with the TRF schedule.

One or more embodiments achieve a genuine fasting using mechanisms including a food blockage. The present inventors have recognized that if excessive food is not consumed during the feeding cycle, the rodents can still freely consume the food during the fasting cycle, thereby distorting the TRF schedule. If too little food is provided, the effect of calorie restriction will be considered, and as a result, impacts of fasting cannot be accurately determined. To overcome these disadvantages, according to some embodiments, a shield covers a portion of an engineered food tray. Food in the form of pellets is placed between two slabs. The slabs are movable along a guide rail between the accessible region and the blocked region so that no leftover food is accessible to the rodents during fasting. In these embodiments, at preset time points, the food pellets are transferred to the unblocked side of the food tray, granting the housed rodents access to the pellets. On the other side, the food pellets are transferred to the shielded area to prevent access to food during fasting. According to some other embodiments, a partially shielded cylindrical food container is installed. Food pellets always sit at the bottom by gravity. Rotation of the cylindrical food container switches the food pellets between exposure and blockage to the rodent. These designs ensure the housed rodents can only be fed at the designated time points without imposing calorie restriction or introducing any other factors that might affect the experimental results.

One or more embodiments provide an automatic feeder apparatus or system with improved or high compatibility with laboratory animal cages. According to some embodiments, the ordinary food tray can be applied and further modified when necessary. By way of example, the mechanical components may be installed above the food tray but below a cover lid. According to some other embodiments, the cylindrical food container is designed to fit well into the individually ventilated cages (IVCs). The mechanical components are installed either above or at the side of the food container, and below the cover lid. In these embodiments, the automatic feeder apparatus or system can be adapted to fit into multiple types and sizes of animal-holding cages, including but not confined to, IVCs, open cages, mouse cages, and rat cages. The electrical components, such as the connection cables and the programmable controller, are located beside the animal holding rack. Space usage is improved or minimized and compatible with conventional animal-holding racks and ordinary animal-holding areas.

One or more embodiments provide an automatic feeder apparatus or system with improved safeguarding of animal welfare. The mechanical parts, for instance, the motor and the printed circuit boards (PCBs) with an electric circuit including various electronics, such as one or more of a microcontroller, a user interface, a memory, etc., are situated out of reach from the rodents. It prevents the rodents from damaging the automatic feeder apparatus or system and ensures the safety of the rodents.

One or more embodiments provide an automatic feeder apparatus or system with reduced noise. Many existing feeders utilize a crude vertical dropping mechanism to release the food pellets into the tray, which generates a loud noise. This existing setup may disturb the experimental rodents and other rodents in the same animal holding room, thereby generating unwanted stress and affecting their behaviors. To avoid such unwanted noise and environmental stimuli, one or more embodiments implement a movement (such as sliding, rotation, etc.) of the food pellets into the feeding space. The noise generated during the movement can be reduced to below 60 dB and will not elicit any reactions from the rodents during operation.

One or more embodiments provide an automatic feeder apparatus or system with improved water-resistant properties. At least certain parts of the automatic feeder apparatus or system are built to be water-resistant and spark-proof. During operation, the heat or sparks generated by the automatic feeder apparatus or system can be reduced or even avoided, thereby improving the safety of the rodents and other persons in the animal holding room.

Further embodiments of the automatic feeder apparatus, systems, methods thereof are discussed below. The details described herein with respect to the figures are exemplary and not exhaustive. Various variations on these embodiments are possible.

FIGS. 2A and 2B are schematic illustrations of a front view and a side view respectively of a rodent cage 200*a* and an automatic feeder apparatus 220. The rodent cage 200*a* as illustrated in this embodiment is an individually ventilated cage (IVC), despite other types of cages can be used. The automatic feeder apparatus 220 is fitted to the rodent cage 200*a* for feeding a rodent staying therein.

The automatic feeder apparatus 220 comprises a food container 220*a* for holding food, such as food pellets or food chunks (e.g. biscuits) suitable for rodents. The food pellets or chunks can be of various shapes, including but not limited to, cylindrical or rectangular shape. The food container 220*a* comprises an accessible region 202 (such as a pellet accessing site) and a blocked region 204 (such as a pellet blocking site). The food container 220*a* is configured to be automatically switchable between an accessible state, in which the food is accessible to the rodent, and a blocked state, in which the food is blocked from access to the rodent.

By way of example, the food container 220*a* comprises a shield for forming the blocked region 204. The shield can be a physical barrier that protects the diet from access by the rodent. The material of the shield is preferably strong and durable to prevent rodents from damaging it, and is further preferably corrosion-resistant to uphold animal welfare. In one or more embodiments, the shield is made of stainless steel.

As illustrated in FIGS. 2A and 2B, the food container 220*a* comprises a food compartment 212 (such as a pellets storage area) for holding the food. In some embodiments, the food compartment 212 is moveable within the food container 220*a* between the accessible region 202 and the blocked region 204, thereby switching the food container 220*a* between the accessible state and the blocked state. As the rodent stays in the rodent living area 208, the rodent can access the food when the food is in the accessible region 202, but will be blocked by the shield from accessing to the food when the food is in the blocked region 204.

In the present embodiment, the food container 220*a* is disposed at the upper or top portion of the rodent cage 200*a* covered with a lid 206. The rodent cage 200*a* can be any rodent cage compatible with the automatic feeder apparatus 220, such as the cage shown in FIG. 1A. In some embodiments, to make full use of the laboratory space, dozens of or even tens of rodent cages can be arranged on a rack system. The rack system may comprise several layers. On each layer, plural rodent cages are arranged side by side. The rack system can be equipped with a stand-alone ventilation system for ventilating and monitoring the air qualification for the tens of rodent cages together. The ventilation system can also exhaust stale air from the inside of the rodent cages to the outside of the laboratory.

By way of example, the food container 220*a* may occupy part of the top space of the rodent cage 200*a*, leaving the rodent living area 208 below the food container 220*a* for the rodent's activities. In some embodiments, the food container 220*a* can be a grille food tray with gratings. The food container 220*a* may be provided with a mesh 209 for rodent grasping. When the food container 220*a* is in the accessible state, the gratings allow the food at the accessible region 202 to be accessed by the rodent via the spacings of neighbouring gratings. As shown in FIG. 2B, the accessible region 202 can be provided at the bottom wall or at the side wall of the food container 220*a*. The food is in the form of food pellets or chunks. The spacing between neighbouring gratings is smaller than the size of the food such that the food is capable of being held onto the grille food tray and will not drop from the spacing. When the rodent intends to eat, it will acquire the food through the spacing. The spacing can be smaller than the size of the food but larger than the size of the rodent snout or claw.

Figure 2D:
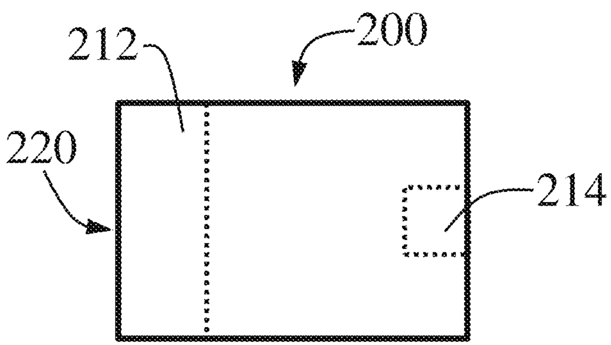
FIG. 2D is a schematic illustration of another arrangement of a rodent cage and an automatic feeder apparatus according to certain embodiments of the present disclosure.

FIGS. 2C and 2D are schematic illustrations of top views of rodent cages 200 and automatic feeder apparatus 220 with varied arrangements according to certain embodiments. The automatic feeder apparatus 220 in FIG. 2C is provided along the shorter edge of the rodent cage 200 and comprises a food compartment 212 and a water storage area 214. In FIG. 2D, the food compartment 212 and the water storage area 214 are separately deployed in the rodent cage 200. The larger food compartment 212 accommodates the food, while the smaller water storage area 214 can hold a water container. The food compartment 212 can be disposed differently according to practical needs.

Figure 2E:
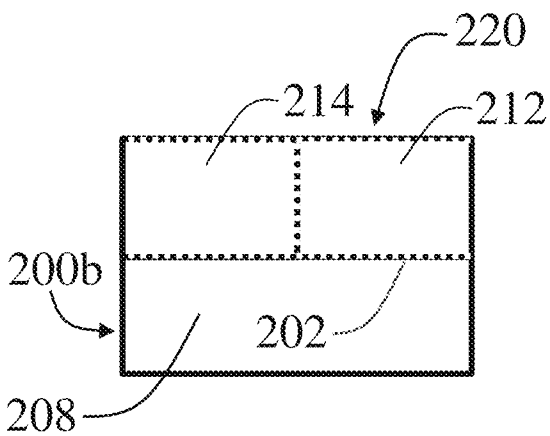
FIG. 2E is a schematic illustration of a front view of an open rodent cage and an automatic feeder apparatus according to certain embodiments of the present disclosure.
Figure 2F:
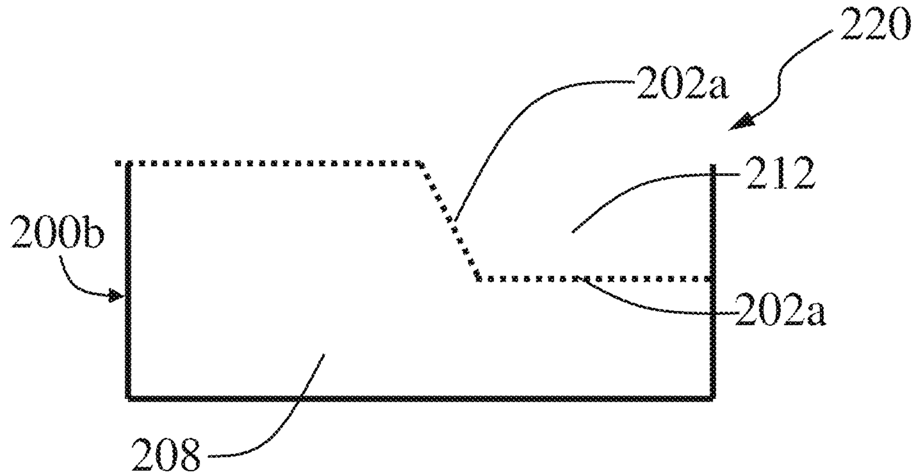
FIG. 2F is a schematic illustration of a side view of the open rodent cage and automatic feeder apparatus of FIG. 2E.

FIGS. 2E and 2F are schematic illustrations of a front view and a side view respectively of an open rodent cage 200*b* and an automatic feeder apparatus 220 that fits to the open rodent cage 200*b* according to certain embodiments. The open rodent cage 200*b* has no lid. The automatic feeder apparatus 220 covers the overall top of the rodent cage 200*b*, thereby preventing the rodents in the rodent living area 208 escaping from the cage 200*b*. For example, the automatic feeder apparatus 220 may have a meshing structure that functions as a lid when fitting to the rodent cage. A water storage area 214 is provided next to a food compartment 212. An accessible region 202 is provided for the rodent's access to the food stored in the food compartment 212 when it is in the accessible state (the blocked region is not shown). The rodent can acquire water and/or food through the food and water accessing sites 202*a* located at the bottom wall and/or side wall of the automatic feeder apparatus 220.

Figure 3A:
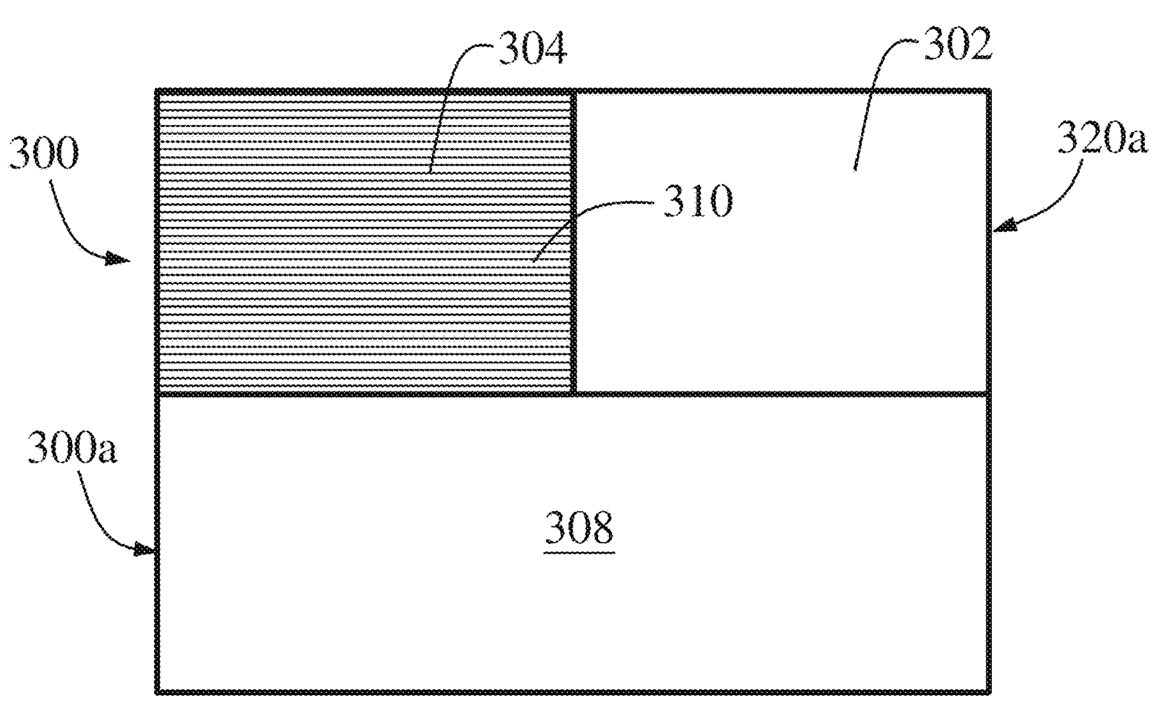
FIG. 3A is a schematic illustration of a top view of an automatic feeder apparatus and a rodent cage according to certain embodiments of the present disclosure.
Figure 3B:
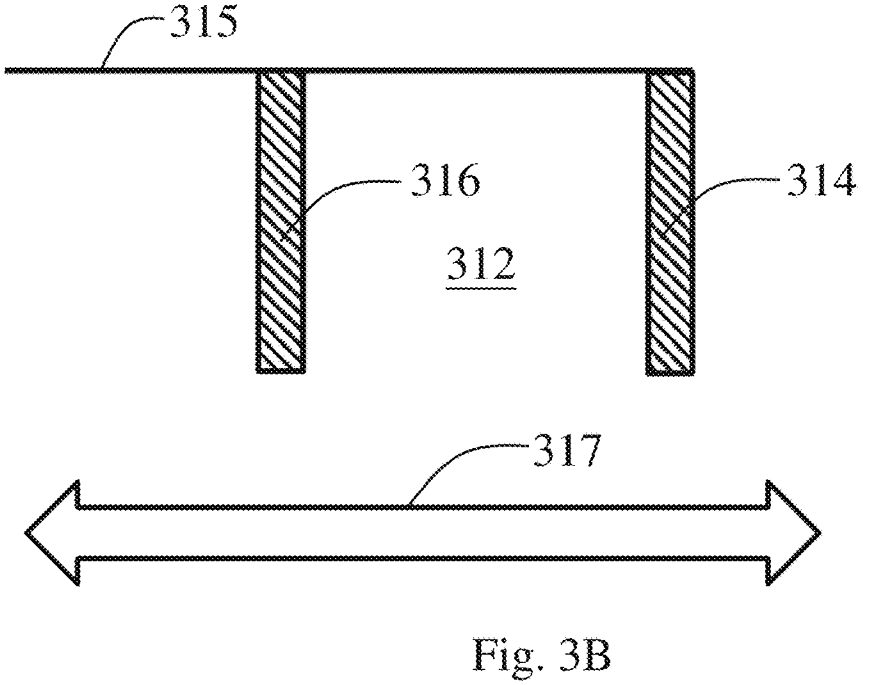
FIG. 3B is a schematic illustration of a pair of slabs and a guide rail used in the automatic feeder apparatus of FIG. 3A according to certain embodiments of the present disclosure.

FIG. 3A illustrates an automatic feeder apparatus 300 and a rodent cage 300*a* according to certain embodiments. FIG. 3B illustrates a pair of slabs and a guide rail used in the automatic feeder apparatus 300 of FIG. 3A according to certain embodiments. The automatic feeder apparatus 300 can be a specific implementation of one or more automatic feeder apparatus as described above. The automatic feeder apparatus 300 comprises a food container 320*a* that comprises an accessible region 302 and a blocked region 304. As shown in FIG. 3A, the food container 320*a* comprises a shield 310 for forming the blocked region 304. The shield 310 prevents the rodent in the rodent living area 308 from accessing the food. The shield 310 can be made of a material that is not easily damaged by the rodent and corrosion-resistant to uphold animal welfare. The material can be, for example, stainless steel. The accessible region 302 is not covered by the shield 310, thereby allowing the rodent to access the food when the food is placed in the accessible region 302.

The food container 320*a* comprises a food compartment 312 for holding the food. The food compartment 312 is formed between a pair of slabs 314, 316 as shown in FIG. 3B. In the present embodiment, the slabs 314, 316 are arranged in parallel and extending downward from a guide rail 315. The guide rail 315 are attached or coupled to the pair of slabs 314, 316 and direct or guide movement of the two slabs, so that the slabs 314, 316 can move (such as sliding) along the guide rail 315 in either direction as indicated by the arrow 317. As the food compartment 312 moves with the slabs 314, 316, movement of the slabs 314, 316 towards or away from the accessible region 302 or the blocked region 304 causes the food container 320*a* to switch between the accessible state in which the food is accessible to the rodent and the blocked state in which the food is blocked from access to the rodent. In some embodiments, one or more openings are provided on top of the space between the slabs 314, 316 for facilitating food replenishment.

Figure 3C:
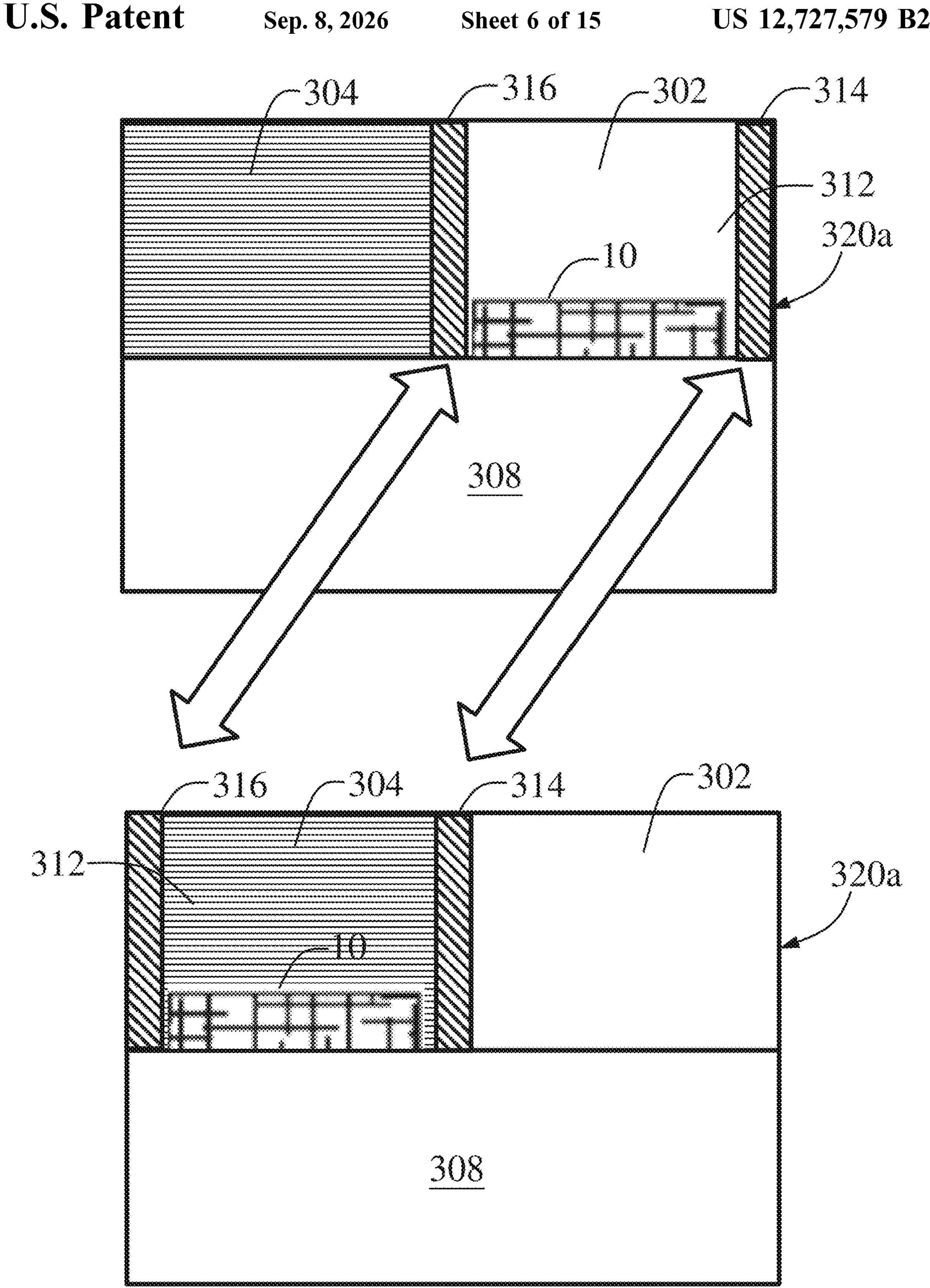
FIG. 3C illustrates switching of a food container between an accessible state and a blocked state according to certain embodiments of the present disclosure.

FIG. 3C illustrates switching of the food container 320*a* between the accessible state (the upper portion of FIG. 3C) and the blocked state (the lower portion of FIG. 3C). The areas filled with horizontal stripes in FIG. 3C indicate the blocked region 304. The top-down process illustrates that the food compartment 312 for holding food 10 is moved, by movement of the slabs 314, 316, from the accessible region 302 to the blocked region 304. When the food compartment 312 is in the blocked region 304, the rodent in the rodent living area 308 cannot access to the food because of the blockage of the shield. On the contrary, the down-top process illustrates that the food compartment 312 for holding the food 10 is moved, by movement of the slabs 314, 316, from the blocked region 304 to the accessible region 302. When the food compartment 312 is in the accessible region 302, the food can be acquired by the rodent for eating.

Figure 4A:
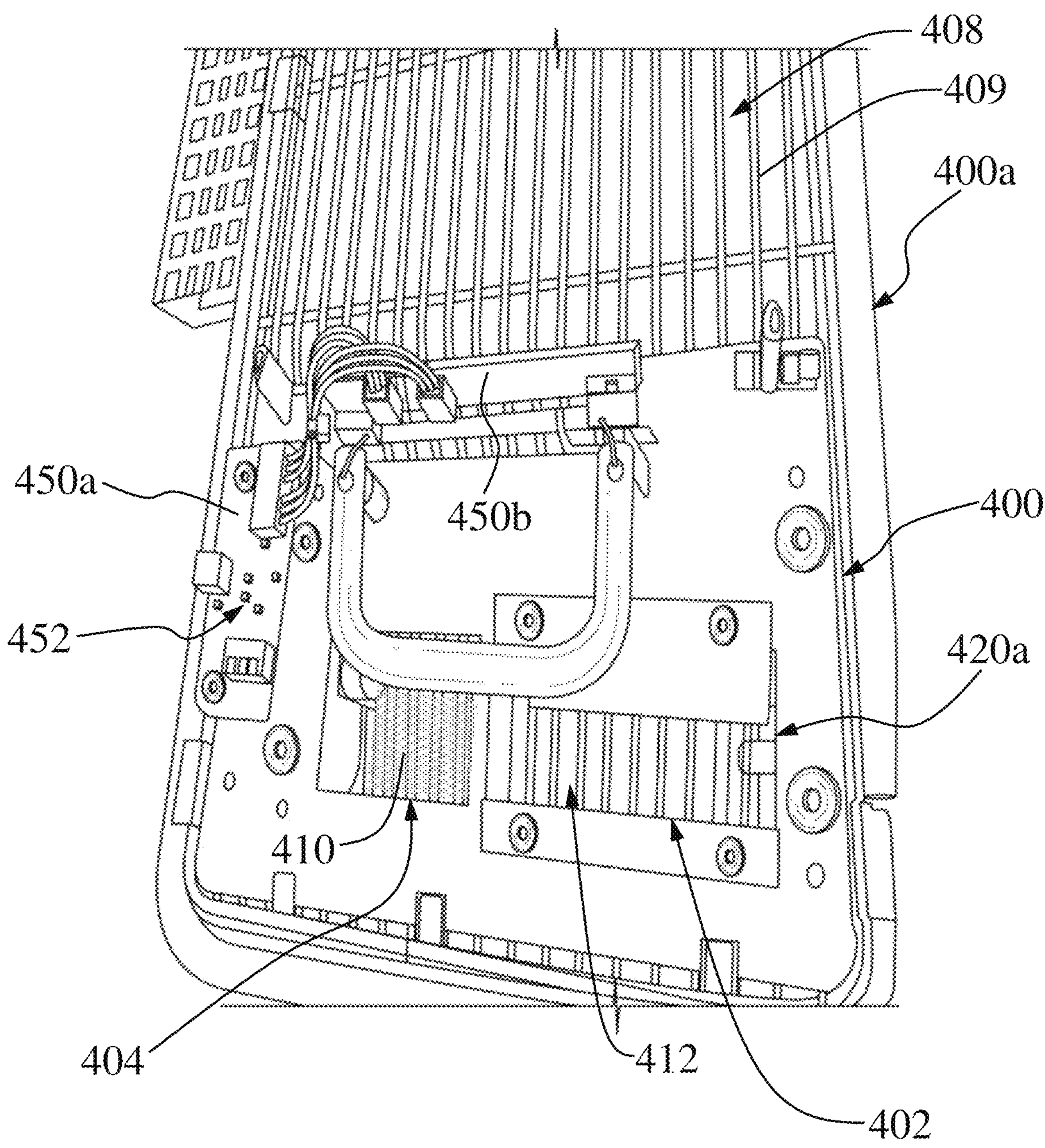
FIG. 4A illustrates an automatic feeder system and a rodent cage viewed from a perspective according to certain embodiments of the present disclosure.
Figure 4B:
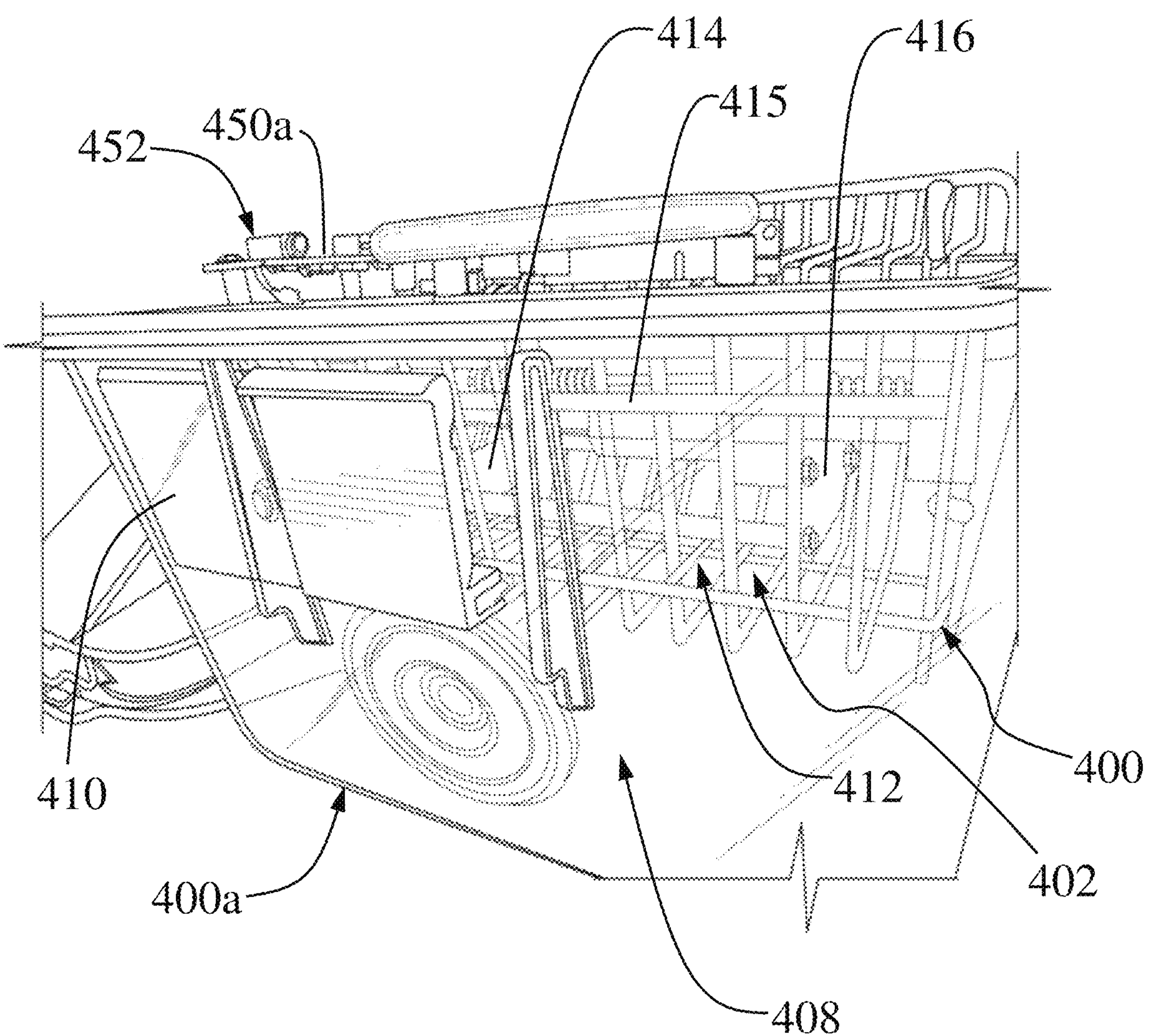
FIG. 4B illustrates an automatic feeder system and a rodent cage viewed from another perspective according to certain embodiments of the present disclosure.
Figure 4C:
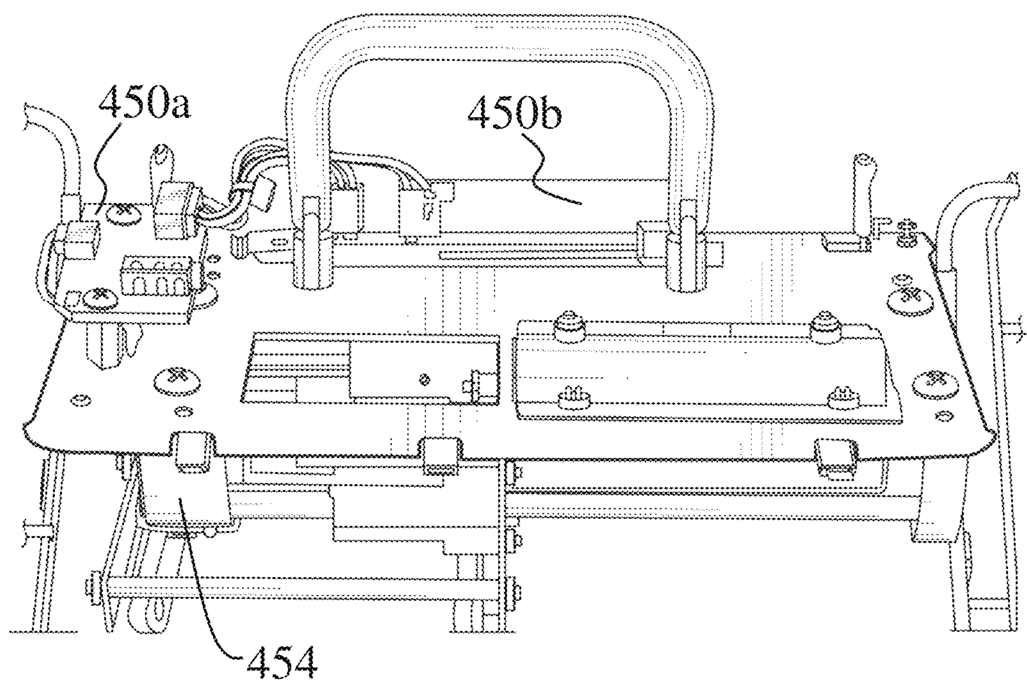
FIG. 4C illustrates an automatic feeder system and a rodent cage viewed from a further perspective according to certain embodiments of the present disclosure.

FIGS. 4A, 4B, and 4C illustrate an automatic feeder system and a rodent cage viewed from different perspectives according to certain embodiments of the present disclosure. For illustrative purpose, only certain parts or components are shown while other parts or component are omitted.

As illustrated, the figures show a rodent cage 400*a* having a rodent living area 408, an automatic feeder apparatus 400 comprising a food container 420*a* that comprises a food compartment 412, an accessible region 402, a blocked region 404 covered by a shield 410. A pair of slabs 414, 416 and a guide rail 415 are also illustrated. A meshing structure 409 is provided and serves various purposes including being graspable by the rodent, functioning as a lid for the rodent cage, etc. In some embodiments, the meshing structure 409 is configured as part of the rodent cage 400*a*, while in some other embodiments, the meshing structure 409 is configured as part of the automatic feeder apparatus 400. Further, one or more opening can be provided at or adjacent to the accessible region 402 and/or blocked region 404 so that food can be conveniently replenished.

Further, as illustrated in FIG. 4A, two printed circuit boards (PCBs) 450*a*, 450*b* are provided on top of the automatic feeder apparatus 400. The number of PCBs can be less than two or more than two depending on practical needs. Taking PCB 450*a* as an example, it comprises an electric circuit 452 for applying various TRF schedules to the automatic feeder apparatus 400.

The automatic feeder system is attached to the rodent cage 400*a*, and can be modified to accommodate a variety of laboratory rodent cages, including but not limited to IVC or open cages. The automatic feeder system further comprises an actuator 454 for actuating the automatic feeder apparatus 400 such that the food container 420*a* is switchable between the accessible state and the blocked state. The actuator can be implemented as an electric motor as shown in FIG. 4C. In some embodiments, the actuator can be a linear actuator or a solenoid cylinder. The actuator 454 is controlled by the electric circuit 452. For example, the electric circuit 452 controls ON/OFF states of the actuator 454 as well as its operation speed by monitoring the current flowing through the actuator. The electric circuit 452 not only monitors the status of the actuator 454 and also adjusts the controlling over the actuator 454 based on the monitored information, such as load information. In the present embodiment, the actuator 454 can drive the slabs 414, 416 to move both slabs along the guide rail 415 at a controlled speed of, such as 500 um/s, 1 mm/s, 2 mm/s, 5 mm/s, 10 mm/s, or other customized speed. In the present embodiment, the preferrable speed is 1 mm/s. In some embodiments, the actuator 454 drives the slabs at a relatively slow speed to avoid the rodent from being hurt.

In some embodiments, the automatic feeder system is provided with a rebound function. By way of example, the actuator is implemented as an electric motor. A Hall sensor is provided for detecting current of the motor by measuring the magnetic field generated by the current flowing through the motor. As the load on the motor increases, the motor draws more current to produce the necessary torque, which strengthens the magnetic field. The Hall sensor can be placed near the current-carrying conductors or a magnet in the motor and detects this change in the magnetic field and generates a corresponding voltage signal detectable by the electric circuit. When the rodent obstructs movement of the food compartment, the load on the motor will increase. As such, the motor current will increase, which can be detected by the electrical circuit via the Hall sensor. In this way, whether the rodent is on the way of the movement of the food compartment can be detected and the safety of the system can be improved. For example, if the rodent tries to access the food tray during the movement of the slabs, an increased current caused by the increased load posed by the rodent will be detected. In response, the electric circuit will first pause the motor, and then drive the motor to rotate reversely to move the slabs back to their original locations. The slabs will then resume to move in the original direction after a short pause, and eventually complete their cycle when the obstruction no longer exists. The rebound function prevents the rodents and the users from injury, thereby improving the system safety.

In one or more embodiments, the automatic feeder system is designed to be waterproof and spark proof. The system can operate at a voltage no greater than DC 12V. The motor is drip-proof and is protected with an additional enclosure. In one or more embodiments, the electric circuit, the motor and other electric devices are provided at the top portion of the rodent cage or other locations away from being touched by the rodent. This can prevent electronic devices from being damaged by the rodent on one hand and avoid injury of the rodent on the other hand. Further, one or more of other sensors can be added to the automatic feeder system. For example, a temperature sensor may sense a high-temperature condition and the temperature information can be transmitted to the electric circuit. A weight sensor may sense the weight of the food held in the food compartment and the weight information can be transmitted to the electric circuit. The automatic feeder system can monitor the food consumption during each feeding and fasting cycle.

Figure 5A:
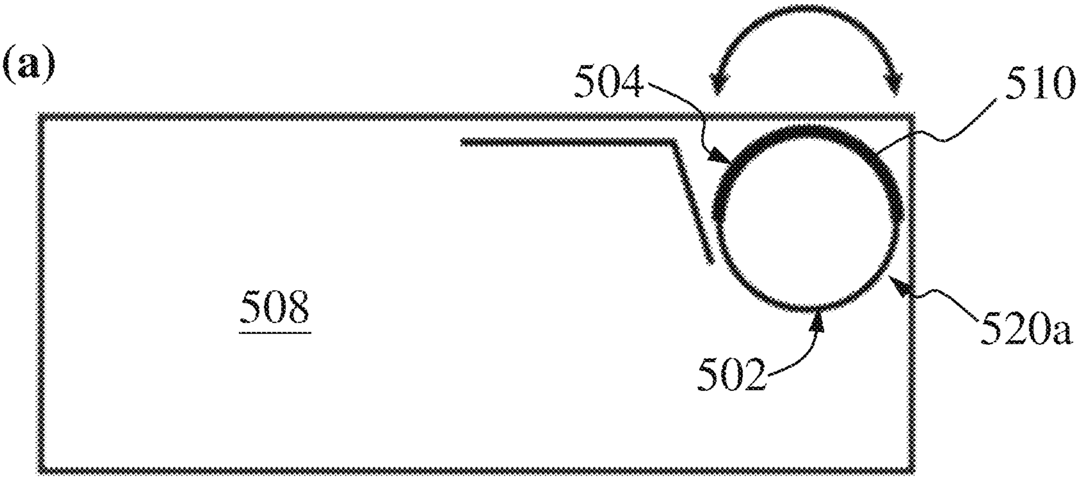
FIG. 5A is a schematic illustration of a food container in (a) an accessible state and (b) a blocked state according to certain embodiments of the present disclosure.
Figure 5A:
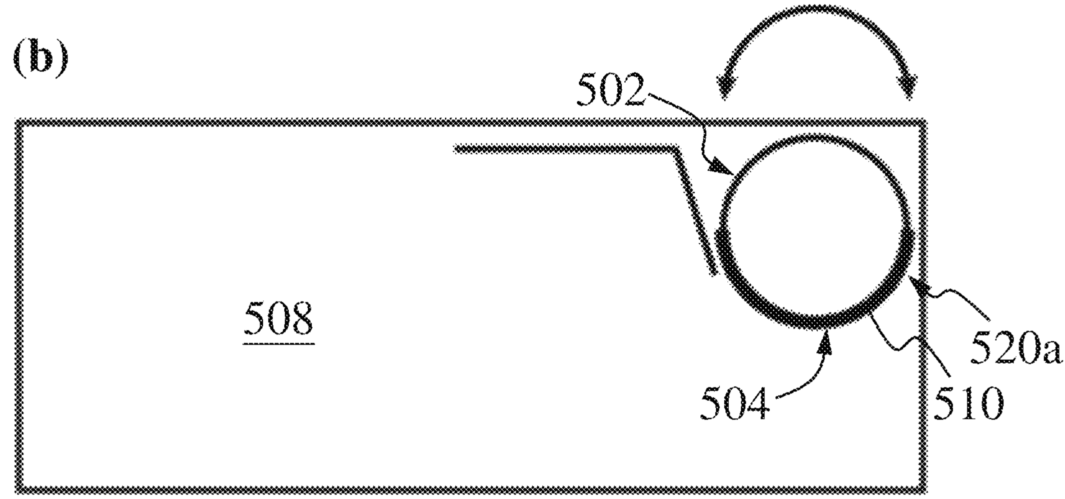
Figure 5B:
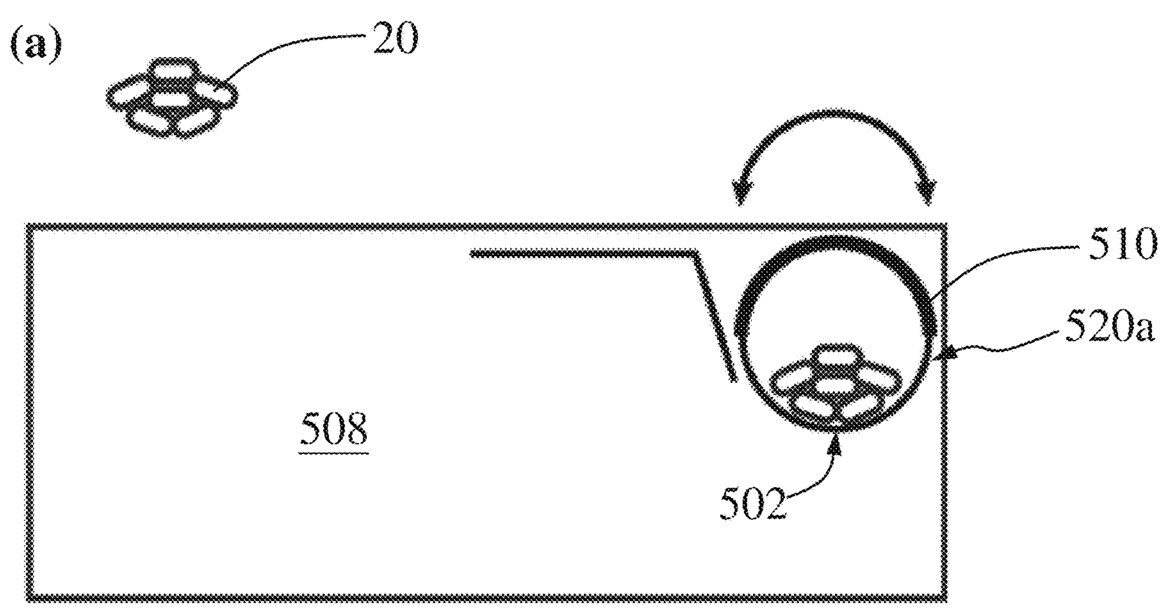
FIG. 5B illustrates operation of the food container of FIG. 5A in (a) the accessible state and (b) the blocked state according to certain embodiments of the present disclosure.
Figure 5B:
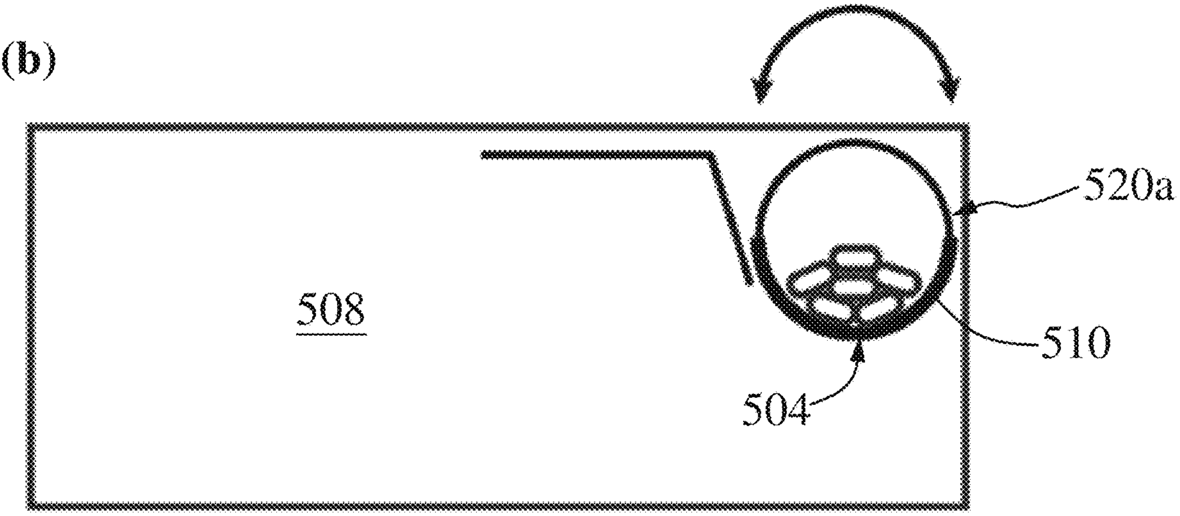

FIG. 5A is a schematic illustration of a food container 520*a* in (a) an accessible state and (b) a blocked state according to certain embodiments. FIG. 5B illustrates the operation of the food container 520*a* of FIG. 5A in (a) the accessible state and (b) the blocked state according to certain embodiments.

The food container 520*a* can be a food container of an automatic feeder apparatus as described above in one or more embodiments. The food container 520*a* comprises an accessible region 502 and a blocked region 504. The blocked region 504 is formed by covering a certain portion (such as 50%) of the inner or outer surface (such as circumferential surface) of the food container 520*a* with a shield 510. The blocked region may be formed in other manners, such as a shield being formed integrally as part of the food container 520*a*.

The food container 520*a* is automatically switchable between an accessible state, in which the food is accessible to the rodent in a rodent living area 508, and a blocked state, in which the food is blocked from access to the rodent in the rodent living area 508. Switching between the two states can be achieved by rotation of the food container 520*a* around a rotation axis along a clockwise or counterclockwise direction as indicated by the double-headed arrow. State switching involves rotation of the accessible region 502 and the blocked region 504. Only when the accessible region 502 rotates to the lower position and exposes to the rodent living area 508, the rodent can access the food in the food container 520*a* since no shield blocks the food. For example, during feeding, the food container 520*a* rotates to the extent that the food pellets 20 are exposed (FIG. 5B (a)) and accessible to the rodents. During fasting, the food container 520*a* rotates to the extent that the food pellets 20 are positioned on top of the shield 510 (FIG. 5B (b)) and access to the food pellets 20 is blocked. Note that due to gravity, the food pellets 20 are always located in the lower part of the food container 520*a* as shown in FIG. 5B.

It will be understood that rotation of the food container can be driven by an actuator, such as an electric motor, a linear actuator, or a solenoid cylinder. The actuator can be controlled by an electric circuit with prestored instructions, thereby realising an automatic state switching for the food container. In some embodiments, a slow rotating function is provided. The rotational speed of the food container can be slow, preset at 6 rotations per minute (RPM) in the present embodiments while adjustable according to practical needs, thereby to avoid injury to the rodent.

Figure 6A:
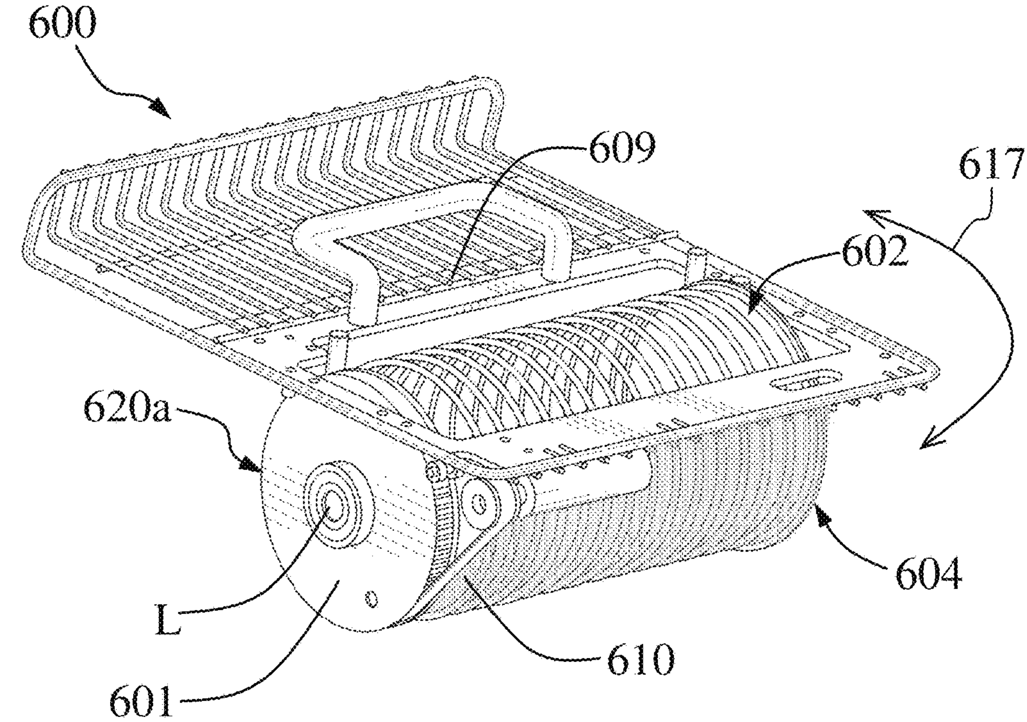
FIG. 6A is a schematic illustration of an automatic feeder apparatus where the food container is in a blocked state according to certain embodiments of the present disclosure.
Figure 6B:
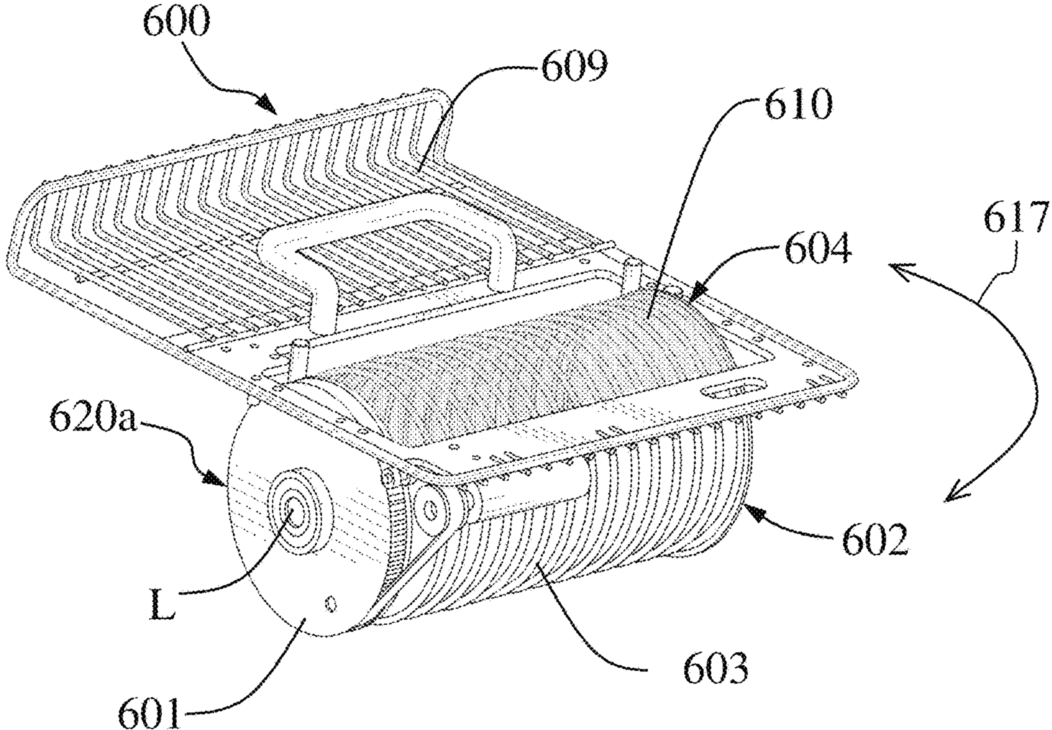
FIG. 6B is a schematic illustration of the automatic feeder apparatus of FIG. 6A where the food container is in an accessible state according to certain embodiments of the present disclosure.

FIG. 6A is a schematic illustration of an automatic feeder apparatus 600 where food container 620*a* in a blocked state according to certain embodiments. FIG. 6B is a schematic illustration of the automatic feeder apparatus 600 of FIG. 6A where the food container 620*a* in an accessible state. The food container 620*a* comprises a cylindrical body 601 and a shield 610 for covering a circumferential portion of the cylindrical body 601 to form the blocked region 604. The accessible region 602 is not covered by any shield. The shield 610 prevents the rodent beneath from accessing the food within the food container 620*a*. The shield 610 can be made of the material such as stainless steel. The cylindrical body 601 can rotate about a rotational axis L clockwise or counterclockwise as shown in a rotational direction 617. During operation, the food is always located at the lower portion of the cylindrical body 601 due to the gravity, regardless of the rotation of the cylindrical body 601. That is, in the present embodiment, the physical location of the food compartment for holding the food remains still, but the food compartment is alternatively formed by either the accessible region 602 or the blocked region 604 with the rotation of the food container 620*a*. The food is accessible to the rodent only when the food compartment is formed by the accessible region 602. As further illustrated in FIGS. 6A and 6B, a meshing structure 609 is provided and has multiple gratings. The meshing structure 609 serves various purposes including being graspable by the rodent, functioning as a lid for the rodent cage, etc. While the meshing structure 609 is illustrated as part of the automatic feeder apparatus 600, it will be understood that it can be configured differently, such as being part of a rodent cage.

Figure 7:
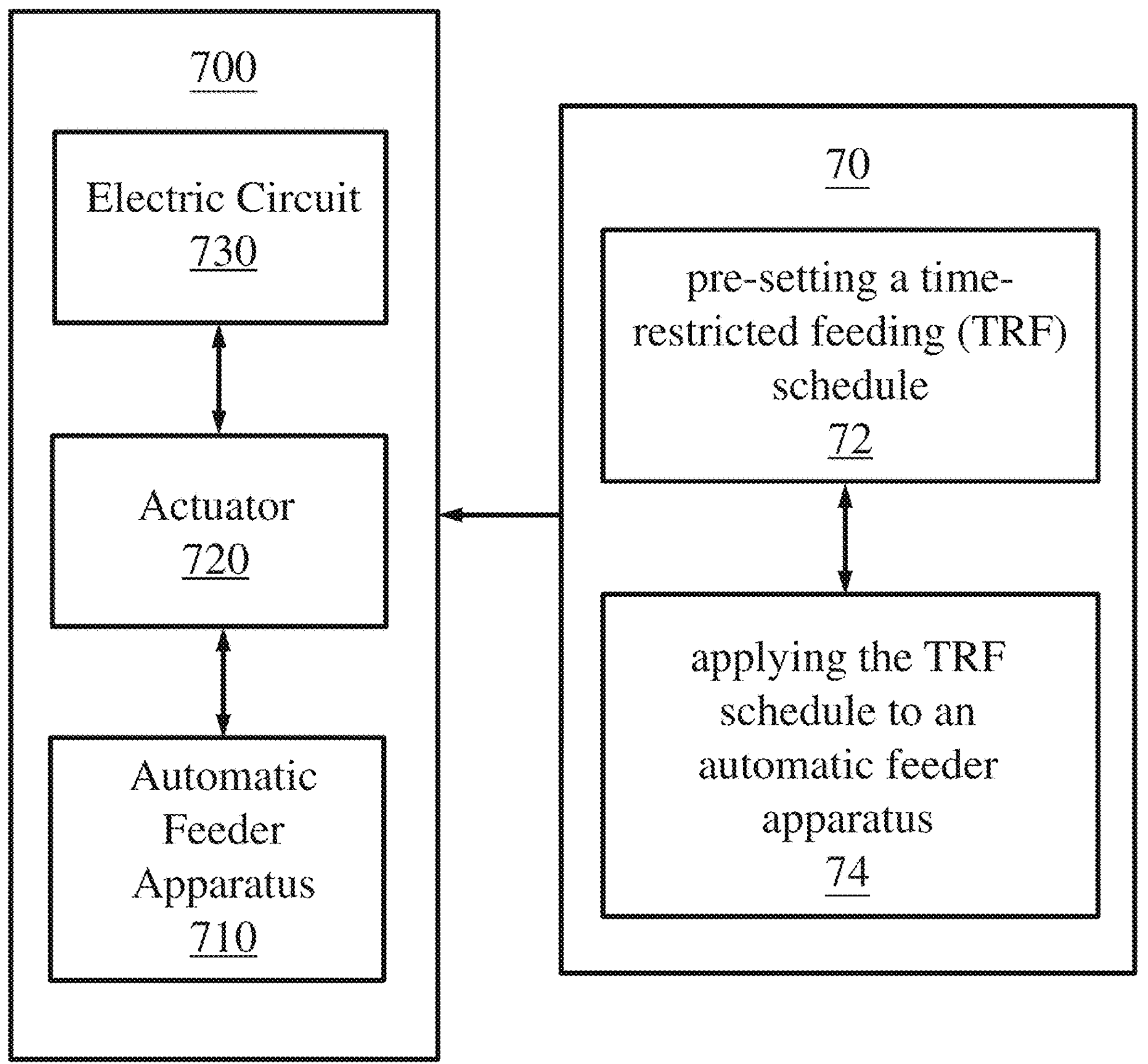
FIG. 7 illustrates an automatic feeder system according to certain embodiments of the present disclosure.

FIG. 7 illustrates an automatic feeder system 700 according to certain embodiments. The automatic feeder system 700 comprises an automatic feeder apparatus 710, an actuator 720 and an electric circuit 730. The automatic feeder apparatus 710, the actuator 720, and the electric circuit 730 can be a specific implementation of the automatic feeder apparatus, the actuator, the electric circuit respectively as described above with reference to one or more embodiments.

The actuator 720 is configured to actuate the automatic feeder apparatus 710 such that the food container of the automatic feeder apparatus 710 is switchable between an accessible state and a blocked state, as illustrated in one or more embodiments as described above. The electric circuit 730 applies a TRF schedule to the automatic feeder apparatus 710. For example, researchers or users may design various TRF schemes according to certain needs or purposes. The TRF schemes may define fasting and/or feeding cycles with various time points or intervals. The TRF schemes may comprise various variables related to corresponding physical parameters or indicators for rodents under investigation. The TRF schemes can be programmed into the electric circuit 730 in the form of computer instructions. The TRF schedules can be amended, modified, preset and written into the system. The TRF schedules included in the system can be further programmed or refreshed or replaced according to practical needs. In operation, the electric circuit 730 executes the instructions thereon and drives the actuator 720 to actuate the automatic feeder apparatus 710, such that the automatic feeder apparatus 710 can be automatically switched to the desirable state following the preset schemes, thereby to complete the scheme-based experiments automatically without human intervention.

The electric circuit 730, or part of the electric circuit 730, may be implemented on a local PCB, and/or a remote device connected by wire or wirelessly. The remote device may be realized as a server, a computer, a laptop, a mobile device, etc. In some embodiments, a Hall sensor is provided for monitoring the current flow through the actuator 720, and the generated voltage signals are transmitted to the electric circuit 730, such that the electric circuit 730 can monitor the operation of the actuator 720 and providing necessary instructions.

In one or more embodiments, the automatic feeder system 700 executes the method 70 for feeding a rodent. At block 72, a TRF schedule is pre-set. The TRF schedule can be any rodent feeding scheme according to practical needs. At block 74, the TRF schedule is applied to the automatic feeder apparatus for feeding the rodent by executing the electric circuit. In some embodiments, at a first preset time point, the actuator is executed by the electric circuit and thereby actuates the automatic feeder apparatus to switch the food container to the accessible state for feeding the rodent. This can be achieved, for example and depending on the specific structural design of the automatic feeder apparatus, by linearly moving a food compartment of the food container between the accessible region and the blocked region within the food container, or rotating the food container for moving the food between the accessible region and the blocked region. At a second preset time point, the actuator is executed by the electric circuit and thereby actuates the automatic feeder apparatus to switch the food container to the blocked state such that the rodent is prevented from being fed.

One or more other methods may be implemented. For example, one or more methods comprise implementing a rebound function or a slow rotating function to the automatic feeder apparatus as described above, thereby to improve the system safety.

One or more methods as described herein automate experiments or investigations on rodents for their eating and fasting patterns within a restricted time period. One or more methods as described herein automatically provide food accessible to the rodents when the feeding period starts and automatically remove leftover food from the rodents when the feeding period ends, thereby effectively avoid the rodents from eating during the fasting period. One or more methods as described herein enable genuine TRF studies to be conducted automatically with reduced or minimal human interaction, or without human interaction. One or more methods as described herein allow the TRFs schemes to be programable and can be applied to a wide range of circumstances to meet various industrial and scientific needs.

Figure 8:
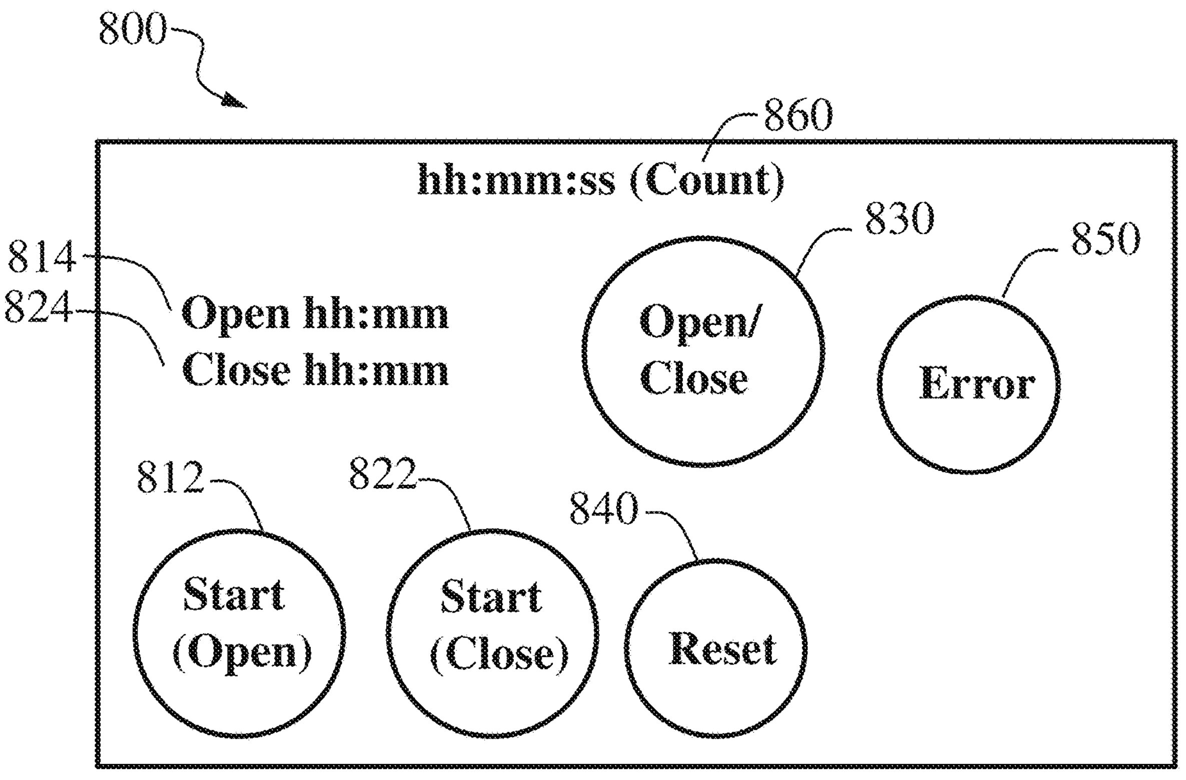
FIG. 8 shows an example of a user interface of the automatic feeder system that implements desired periodic fasting and feeding cycles according to certain embodiments of the present disclosure.

FIG. 8 shows an example of a user interface 800 of an automatic feeder system that implements desired periodic fasting and feeding cycles according to certain embodiments of the present disclosure. The automatic feeder system can be an automatic feeder system as described above with reference to one or more embodiments. Through the user interface 800, one or more parameters related to the automatic feeder system can be displayed for users' view, and/or one or more operations related to the automatic feeder system can be controlled or preset by users.

By way of example, Start (Open) 812 indicates that the food container is in the accessible state at the beginning of the feeding cycle. Start (Close) 822 indicates that the food container is in the blocked state at the beginning of the feeding cycle. Open hh:mm 814 indicates the feeding period. Close hh:mm 824 indicates the fasting period. Open/Close 830 is a button for manually placing the food container in the accessible state (open) or blocked state (close). hh:mm:ss (Count) 860 is used as a counter, demonstrating the current feeding or fasting duration. Error 850 indicates system errors. For instance, the error signals appear when the automatic feeder apparatus fails to switch to the blocked state or the accessible state entirely at the designated time points. After Reset 840 is pressed, the feeding cycle will be terminated. The actuator will not initiate another motion of the food container. The user needs to press Start (Open) 812 or Start (Close) 822 to restart a new feeding or fasting cycle. It will be understood the user interface 800 is for illustrative purpose only and can be modified according to practical needs. For example, the user interface may be configured to provide functions, such as presenting feeding and fasting statistics or an experimental report for rodents.

Figure 9:
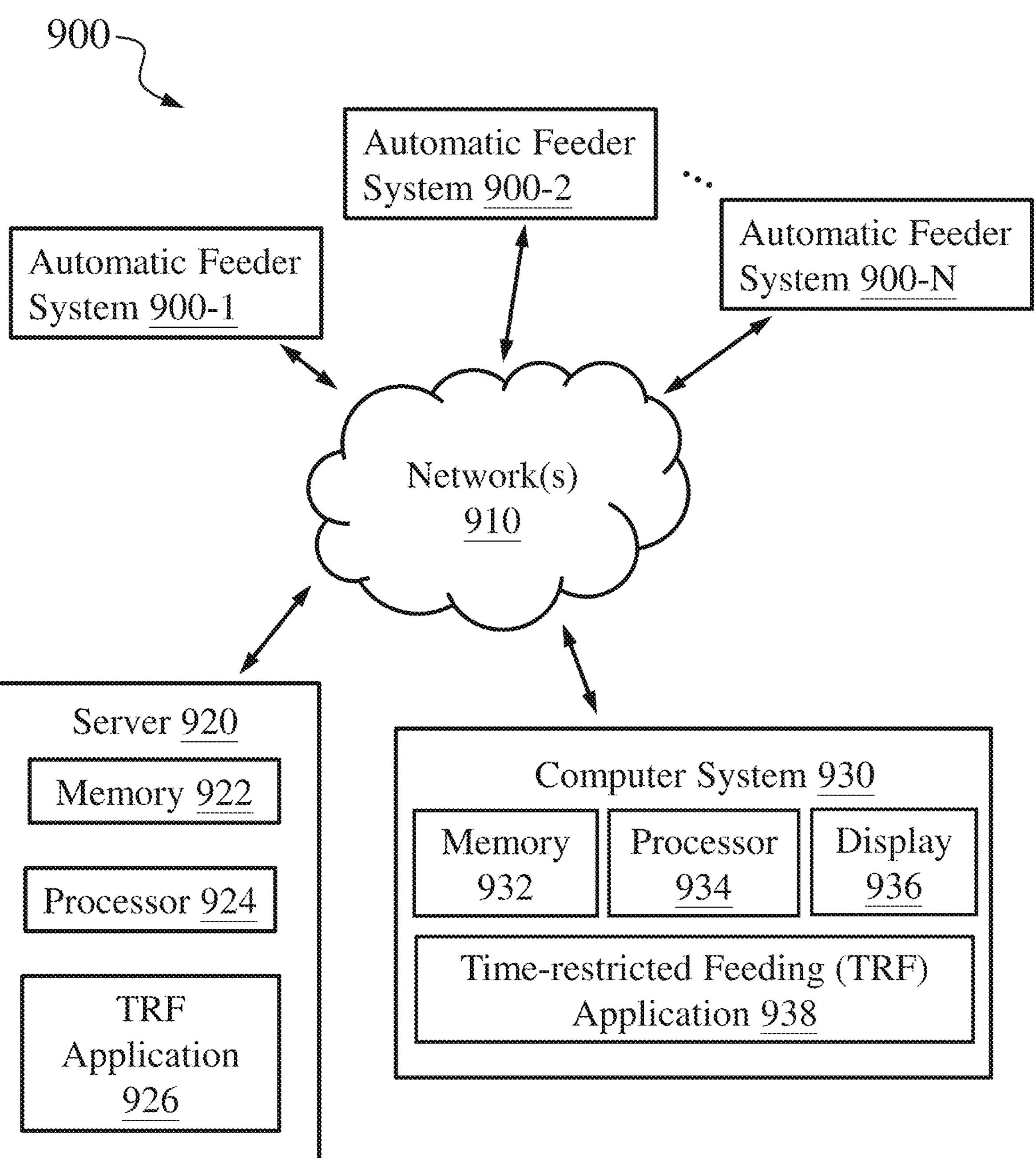
FIG. 9 illustrates a system for feeding rodents in a plurality of cages according to certain embodiments of the present disclosure.

FIG. 9 illustrates a system 900 for feeding rodents in a plurality of cages according to certain embodiments. Each cage may have one rodent staying therein for certain purposes, such as experimental study.

As illustrated, the system 900 comprises automatic feeder systems 900-1, 900-2 . . . and 900-N, where N is a natural number. Each automatic feeder system can be a specific implementation of the automatic feeder system as described above with reference to one or more embodiments. The system 900 further comprises a computer system 930 that communicates with each of these automatic feeder systems via one or more networks 910.

The networks 910 can comprise one or more of a cellular network, the Internet, a local area network (LAN), a personal area network (PAN), home area network (HAM), and other public and/or private networks. Additionally, the computer system needs not communicate with each automatic feeder system through a network. As one example, they can couple together via one or more wires, such as a direct wired-connection. As another example, they can communicate directly through a wireless protocol, such as Bluetooth, near field communication (NFC), or other wireless communication protocol.

The computer system 930 controls operations of the automatic feeder systems 900-1, 900-2 . . . and 900-N. The computer system 930 can comprise one or more of a laptop, a desktop computer, a mini computer, etc. The computer system 930 can be any proper computing device that performs one or more functions as described herein. In a preferred embodiment, the computer system 930 is implemented as a programmable logic controller (PLC). In some embodiments, the computer system 930 can comprise a plurality of computers or computing devices that are physically adjacent or remote and communicate with each other via one or more networks (wired or wireless) for collectively performing one or more functions as described herein.

As illustrated, the computer system 930 comprises a memory 932, a processor 934, a display 936 and a time-restricted feeding (TRF) application 938. The computer system 930 may receive data from one or more of the automatic feeder systems 900-1, 900-2 . . . and 900-N, store the received data in the memory 932, process the received data with the processor 934 and the TRF application 938, and display the results on the display 936 for review, adjustment and/or other necessary operations. It will be understood that a TRF application (such as the TRF application 938 or TRF application 926 as described below) is one or more software programs or instructions designed to perform a specific set of tasks or functions for the user in relation to TRF.

The computer system 930 can apply TRF schedules to the rodents in the plurality of cages by switching states of automatic feeder apparatus of the plurality of automatic feeder systems 900-1, 900-2 . . . and 900-N simultaneously. The TRF schedules are programmable and can be stored as subroutines in the system for execution according to practice needs, such as certain experimental purposes.

In some embodiments, the system 900 comprises a server 920. The server 920 can be a local computer server or a cloud computer server. The server 920 comprises one or more components of computer readable medium (CRM) or memory 922, a processing unit or processor 924 (such as one or more processors, microprocessors, and/or microcontrollers), and a TRF application 926. The server 920 communicates with the automatic feeder systems 900-1, 900-2 . . . and 900-N and the computer system 930 over the networks 910. The server 920 can retrieve data and perform one or more methods as described herein and send the results to the computer system 930 for output, storage, review, and adjustment, etc. In some embodiment, the server 920 can be connected to local interfaces such as an iPad, a tablet, a smartphone, a display monitor with keyboard and mouse for adjustment. In some embodiment, the server 920 can incorporate artificial intelligence (AI) functions and use the data to develop machine learning algorithms for programming the TRF schedules, thereby to improve the experimental study on rodents.

It will further be appreciated that any of the features in the above embodiments of the disclosure may be combined together and are not necessarily applied in isolation from each other. Similar combinations of two or more features from the above described embodiments or preferred forms of the disclosure can be readily made by one skilled in the art.

As used herein, the term "electric circuit" should be broadly understood as comprising various components that work together to achieve one or more functions as described herein according to one or more embodiments. The electric circuit, for example, may comprise various interconnected components, including but not limited to, conductive pathways (e.g., wires or printed circuit traces), and functional components such as a controller (such as a PLC), memory, and processor etc. The controller governs the operation of the circuit by executing programmed instructions stored in the memory, while the processor processes data or signals as required by the system's application. Additional components, such as switches, sensors, transducers, resistors, capacitors, and inductors, may be integrated to regulate, measure, or modify the electrical flow or perform specific tasks. The circuit operates by maintaining electrical continuity between these components, facilitating controlled energy distribution and signal processing to accomplish desired electrical or computational tasks.

Unless otherwise defined, the technical and scientific terms used herein have the plain meanings as commonly understood by those skill in the art to which the example embodiments pertain. It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:

1. An automatic feeder apparatus for feeding a rodent in a cage, the automatic feeder apparatus comprising: a food container for holding food, the food container comprising an accessible region and a blocked region, wherein the food container is configured to be automatically switchable between an accessible state, in which the food is accessible to the rodent, and a blocked state, in which the food is blocked from access to the rodent, wherein the food container comprises a food compartment for holding the food, wherein the food compartment is moveable within the food container between the accessible region and the blocked region for switching the food container between the accessible state and the blocked state.

2. The automatic feeder apparatus of claim 1, wherein the food container comprises a shield for forming the blocked region.

3. The automatic feeder apparatus of claim 1, wherein the food compartment is formed between a pair of slabs.

4. The automatic feeder apparatus of claim 3, wherein the food container comprises a guide rail for directing movement of the pair of slabs, wherein the pair of slabs are movable along the guide rail between the accessible region and the blocked region.

5. The automatic feeder apparatus of claim 3, wherein one or more openings are provided on top of a space between the pair of slabs for receiving food into the food compartment.

6. The automatic feeder apparatus of claim 1, wherein the food container comprises a grille food tray with gratings for allowing the food in the accessible region to be accessed by the rodent.

7. The automatic feeder apparatus of claim 6, wherein a spacing between neighbouring gratings is smaller than the size of the food such that the food is capable of being held onto the grille food tray.

8. An automatic feeder system comprising:

the automatic feeder apparatus of claim 1;

an actuator for actuating the automatic feeder apparatus such that the food container of the automatic feeder apparatus is switchable between the accessible state and the blocked state; and an electric circuit for applying a time-restricted feeding (TRF) schedule to the automatic feeder apparatus.

9. The automatic feeder system of claim 8, wherein the actuator is selected from a group consisting of an electric motor, a linear actuator, and a solenoid cylinder.

10. The automatic feeder system of claim 8, wherein:

the food container comprises a food compartment for holding the food, the food compartment is formed between a pair of slabs, the food container comprises a guide rail for directing movement of the pair of slabs such that the pair of slabs are movable along the guide rail, and the automatic feeder system further comprises a Hall sensor for detecting current of the actuator.

11. The automatic feeder system of claim 10, wherein the electric circuit is configured to control the actuator such that the pair of slabs apply a rebound function when the current of the actuator is detected to be increased via the Hall sensor.

12. The automatic feeder system of claim 8, wherein the automatic feeder system is configured to operate at a voltage no higher than 12V.

13. A method for feeding a rodent by using the automatic feeder system of claim 8, the method comprising:

pre-setting the time-restricted feeding (TRF) schedule; and applying the TRF schedule to the automatic feeder apparatus for feeding the rodent by executing the electric circuit.

14. The method of claim 13, wherein applying the TRF schedule comprises:

at a first preset time point, actuating, by executing the actuator by the electric circuit, the automatic feeder apparatus to switch the food container to the accessible state for feeding the rodent; and at a second preset time point, actuating, by executing the actuator by the electric circuit, the automatic feeder apparatus to switch the food container to the blocked state such that the rodent is prevented from being fed.

15. The method of claim 14, wherein actuating the automatic feeder apparatus to switch the food container to the accessible state comprises:

linearly moving a food compartment of the food container between the accessible region and the blocked region within the food container, the food compartment holding the food.

16. A system for feeding rodents in a plurality of cages, the system comprising:

a plurality of automatic feeder systems, each automatic feeder system being the automatic feeder system of claim 8 and corresponding to a respective cage of the plurality of cages; and a computer system comprising a time-restricted feeding (TRF) application for applying TRF schedules to the rodents in the plurality of cages by switching states of automatic feeder apparatus of the plurality of automatic feeder systems simultaneously.

17. An automatic feeder apparatus for feeding a rodent in a cage, the automatic feeder apparatus comprising: a food container for holding food, the food container comprising an accessible region and a blocked region, wherein the food container is configured to be automatically switchable between an accessible state, in which the food is accessible to the rodent, and a blocked state, in which the food is blocked from access to the rodent, wherein the food container is rotatable to switch between the accessible state and the blocked state.

18. The automatic feeder apparatus of claim 17, wherein the food container comprises:

a cylindrical body; and a shield for covering a circumferential portion of the cylindrical body to form the blocked region.

19. An automatic feeder system comprising:

the automatic feeder apparatus of claim 17;

an actuator for actuating the automatic feeder apparatus such that the food container of the automatic feeder apparatus is switchable between the accessible state and the blocked state; and an electric circuit for applying a time-restricted feeding (TRF) schedule to the automatic feeder apparatus.

20. The automatic feeder system of claim 19, wherein the actuator is selected from a group consisting of an electric motor, a linear actuator, and a solenoid cylinder.

21. The automatic feeder system of claim 19, wherein the food container has a rotation speed of 6 rotations per minute (RPM).

22. The automatic feeder system of claim 19, wherein the automatic feeder system is configured to operate at a voltage no higher than 12V.

23. A method for feeding a rodent by using the automatic feeder system of claim 19, the method comprising:

pre-setting the time-restricted feeding (TRF) schedule; and applying the TRF schedule to the automatic feeder apparatus for feeding the rodent by executing the electric circuit.

24. The method of claim 23, wherein applying the TRF schedule comprises:

at a first preset time point, actuating, by executing the actuator by the electric circuit, the automatic feeder apparatus to switch the food container to the accessible state for feeding the rodent; and at a second preset time point, actuating, by executing the actuator by the electric circuit, the automatic feeder apparatus to switch the food container to the blocked state such that the rodent is prevented from being fed.

25. The method of claim 24, wherein actuating the automatic feeder apparatus to switch the food container to the accessible state comprises:

rotating the food container for moving the food between the accessible region and the blocked region.

26. A system for feeding rodents in a plurality of cages, the system comprising:

a plurality of automatic feeder systems, each automatic feeder system being the automatic feeder system of claim 19 and corresponding to a respective cage of the plurality of cages; and a computer system comprising a time-restricted feeding (TRF) application for applying TRF schedules to the rodents in the plurality of cages by switching states of automatic feeder apparatus of the plurality of automatic feeder systems simultaneously.

* * * * *